United States Patent Office 3,489,510
Patented Jan. 13, 1970

3,489,510
TREATMENT OF PHOSPHATE ROCK WITH ACIDIC SUBSTANCES AND TO THE RESULTING SUPERPHOSPHATE PRODUCTS
Anson G. Betts, Plainfield, Mass.
(P.O. Box 46, West Cummington, Mass. 01265)
No Drawing. Continuation-in-part of application Ser. No. 557,887, June 16, 1966, which is a division of application Ser. No. 361,207, Apr. 20, 1964, which is a continuation-in-part of application Ser. No. 153,741, Nov. 21, 1961, which in turn is a continuation-in-part of application Ser. No. 768,554, Oct. 21, 1958. This application June 5, 1968, Ser. No. 734,550
Int. Cl. C01b 25/32; C05b 3/00
U.S. Cl. 23—109                      7 Claims

ABSTRACT OF THE DISCLOSURE

In the conversion of powdered phosphate rock to a superphosphate as a product, by mixing and digesting the phosphate rock with an acidic substance of the group consisting of sulphurous, sulphuric and phosphoric acids, and mixtures of said acids, and wet monocalcium phosphate, and holding the mixture until conversion to a superphosphate product is substantially completed, this invention is concerned with getting a reduced cost of production because of use in the mixture of a greater than heretofore proportion of the cheaper phosphate rock and a reduced proportion of the more expensive acidic substance or substances of the conversion to the product, with improved convenience and cleanliness of the operation because of avoidance of liberation of noxious fluoride fumes, with production of novel non-acid superphosphates of improved qualities and characteristics, and the gain of other benefits. The improvements are obtained by use in the said mixture of a proportioned amount of a chemically reactive aluminum compound.

---

This invention relates to the treatment of phosphate rock with acidic substances and to the resulting superphosphate products.

This application is a continuation-in-part of my now pending application Ser. No. 557,887 filed June 16, 1966, now abandoned. The said application Ser. No. was a division of my earlier application Ser. No. 361,207 filed Apr. 20, 1964 because of a requirement of restriction of said application Ser. No. 361,207. The said application Ser. No. 361,207 was a continuation-in-part of my earlier application Ser. No. 153,741 filed Nov. 21, 1961 and the said application No. 153,741 was a continuation-in-part of my first-filed application Ser. No. 768,554 filed Oct. 21, 1958. The said applications Ser. Nos. 361,207, 153,741 and 768,554 are abandoned. The benefits of each of the aforesaid filing dates are claimed. The benefits of the filing date of my aforesaid application 557,887 is claimed.

In this invention, phosphate rock, which may be raw phosphate rock, phosphate rock calcined before use, phosphate rock concentrate, crystalline apatite concentrate, etc., hereinafter referred to as "phosphate rock," is treated with an acidic substance of the group which consists of aqueous sulphuric, sulphurous and phosphoric acids, and of crude "acid superphosphate" of the prior art consisting of monocalcium phosphate $CaH_4P_2O_8 \cdot H_2O$, essentially.

Products of the invention are new superphosphates whereof the principal phosphorus constituent is dicalcium phosphate, and more refined phosphate products derived from said superphosphates by dissolution thereof in solution of sulphurous acid, with separation of solid diluents from the sulphurous acid solution and subsequent recovery from the sulphurous acid solution of a more concentrated phosphate product.

By the term "superphosphate" is meant a mass of solids resulting from mixing and chemically reacting together powdered phosphate rock and an acidic substance of the above-stated group used in the mixture in proportional amount sufficient to substantially complete the chemical decomposition of the refractory calcium phosphate of the rock and to convert the phosphorus constituent of the treated rock to the phosphorus constituent of a less refractory artificial calcium phosphate product. It is a characteristic of the superphosphates of the prior art and of the novel superphosphates of this invention that they contain as an ingredient, undecomposed particles of sand, clay and other non-phosphorus minerals as impurities of the phosphate rock used, unseparated and unremoved from the superphosphate product.

In the practice of the invention the proportional amount of acidic substance of the above-stated group mixed with and used to decompose phosphate rock, converting the mixture to a superphosphate, is substantially less than the proportion of such acidic substances similarly required and used in the prior art of converting a mixture of powdered phosphate rock and acidic substance to a superphosphate product, thereby reducing the cost of manufacture of the superphosphate product, and reducing the dilution of the valuable phosphorus component of the product by introduced non-phosphate additions. In the invention, the reduction in proportional requirement of acidic substance used to decompose the refractory calcium phosphate of the used phosphate rock producing instead a less refractory artificial calcium phosphate contained in the superphosphate product, and the novel means of accomplishing the same, compared to the greater proportional amount of acidic substance similarly required to effect the decomposition of the treated phosphate rock in the prior art, and compared to the greater dilution of the superphosphate product of the prior art by non-phosphate additions to the used materials, and the novel means used to accomplish the said improvements, appear in the following.

It is an object to reduce the cost of manufacturing an agriculturally usable superphosphate by reducing the required proportion of acidic substance used to convert a mixture of powdered phosphate rock and applied acidic substance to a superphosphate, and to reduce the dilution of the phosphorus of the product by use of a reduced addition of acidic substance to the mixture.

In the prior art of fertilizer production wherein fluoriferous phosphate rock is treated with a strong cheap common polybasic acid used to convert a mixture of powdered phosphate rock and acid of treatment directly to a superphosphate, a large proportion of the fluorine of the used phosphate rock is not separated and removed but remains and exists as a component of the fertilizer product. Such unseparated and unremoved fluorine is believed to have the capacity, when the fertilizer product is added to land to be fertilized, of chemically reacting with phosphate already present in the land and phosphate of the added fertilizer, to form an agriculturally refractory fluophosphate, with the bad result of reducing the fertilizing effectiveness of fertilizers produced in the prior art. It is an object to produce a fertilizer product wherein the fluorine present is firmly and chemically already combined with aluminum and not chemically reactive with soil-contained or fertilizer-added phosphate.

The superphosphates of the prior art have an acidic character because of the large amount of contained acidic calcium monophosphate while the superphosphates made according to the invention contain the phosphorus mostly present as non-acidic dicalcium phosphate. It is an object to produce a non-acidic neutral superphosphate and to produce the same at reduced cost per weight unit of contained phosphorus.

In the production of a superphophate product using direct chemical action of a polybasic acid of the group consisting of sulphurous, sulphuric and phosphoric acids and mixtures of any of them, it is an object to achieve the novel conversion of the phosphorus component of the used phosphate rock mainly to the phosphorus component of dicalcium phosphate contained in the resulting superphosphate product. In the hereindescribed production of a superphosphate, the said object is accomplished by the described use of an aluminum compound. In a preferred and more economical production of a novel superphosphate herein disclosed, it is an object to uitilize inexpensive aluminous phosphate mineral as source of the provided and used aluminum compound and as a source of an increment in the quantity of phosphorus contained in the novel superphosphate product.

In the prior art of producing superphosphates by mixing and chemically reacting powdered phosphate rock with aqueous acid selected from the group of acids which consists of sulphuric, phosphoric and mixed sulphuric and phosphoric acids, there is a troublesome emission of fluorine-containing gases or vapors constituting a nuisance, a health hazard and a requirement of expenses for control of the gases etc. In the conversion of a mixture of phosphate rock and an acid of the latter said group, it is an object to prevent and avoid such emission.

Other objects appear in this specification.

In the practice of the invention, wherein powdered phosphate rock is mixed and treated with a selected proportion of aqueous acid of the above-stated group, and chemical reaction between the phosphate rock and the acid of treatment results in decomposition of the calcium phosphate constituent of the used phosphate rock and conversion of constituents of the mixture to a novel superphosphate whereof the phosphorus is preponderatingly present as hydrated dicalcium phosphate, the improved and novel result is effected by the herein described and shown-by-examples use of a fluorine-acceptive aluminum salt (or by use of an aluminum compound which forms an aluminum salt during such conversion) provided and present in the reacting mixture of phosphate rock and acid of treatment.

(In the superphosphates of the prior art most of the phosphorus is present in the form of hydrated monocalcium phosphate and the superphosphates are of an acid nature.)

In the practice of the invention wherein a proportioned mixture of powdered phosphate rock and aqueous acid selected from the said group of acids is provided to contain a fluorine-acceptive aluminum salt, the provision of a proportional amount of aluminum salt that contains less than about 70 parts of aluminum (element) for each 100 parts of fluorine (element) contained in the treated portion of the phosphate rock tends to be insufficient (1) to result in conversion of a high percentage of the phosphorus of the mixture to the phosphorus constituent of dicalcium phosphate contained in the resulting superphosphate product, (2) to fully suppress emission of fluoride vapors from the resulting mixture, and (3) to fully convert the fluorine of the treated phosphate rock to an aluminum-fluorine compound contained in the superphosphate product, with the fluorine then beneficially present in the superphosphate product in combination with aluminum. The use of a proportional amount of aluminum in so-provided and used aluminum salt, in excess of 100 parts of aluminum per 100 parts of fluorine in the so-treated phosphate rock, by weight, tends to result in a superphosphate product containing more aluminum in other and non-fluoride combination than is desirable, especially for subsequent removal and recovery of both aluminum and fluorine from the superphosphate product.

While phosphate rocks of the commercial grades selected for treatment with acids usually contain minor proportions of aluminum silicates, and other aluminous minerals in still smaller proportions, so-contained aluminous minerals might be supposed to dissolve in acid solution applied to phosphate rock for the decomposition and conversion, in a manner to provide an effective amount of dissolved aluminum to beneficially combine with the fluorine of the treated phosphate rock, preventing emission of fluoriferous fumes and obtaining other benefits, but lack of such results in the prior art, and my researches, indicate that so-contained aluminum silicate etc. has not substantially provided, and does not and cannot provide, in the acid treatment of phosphate rock, formation of sufficient dissolved aluminum salt to avoid the nuisances, losses and product inferiorities of the prior art.

My researches indicate that the herein described use of an aluminum salt with acid of decomposition of phosphate rock, gives the herein-described results and benefits, which I believe to be both novel and useful, and that the preferable proportional amount of provided and used aluminum of aluminum salt, for the more economical, beneficial and practical results, is substantially as described.

Instead however, of solely determining the exact optimum proportional amount of provided and used aluminum compound, in advance, as calculated from the chemical analysis of phosphate rock to be so treated and converted, and considering that phosphate rocks are impure and of uncertain chemical composition, I prefer to adjust the selected proportions of materials used to produce the novel superphosphates, by actual tests made with samples of the materials to be used.

In the practice of the invention in conversion of phosphate rock to a superphosphate product as herein described, none of the fluorine of the treated phosphate rock appears as fluoride vapors, fumes etc., hydrofluoric and fluosilicic acids are not formed as in the practice of the prior art, and the corrosive effects of liberated acids of fluorine, upon apparatus of treatment, are absent. In the practice of the invention the fluorine of the treated phosphate rock is believed to enter the product in the form of aluminum-fluorine compound.

In the conversion of phosphate rock, by use of sulphuric acid as agent of conversion, producing the "common," "regular," "acid," or "normal" superphosphate of the fertilizer trades, the explanatory chemical equation of formation of superphosphate has usually been written as

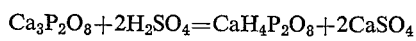

$$Ca_3P_2O_8 + 2H_2SO_4 = CaH_4P_2O_8 + 2CaSO_4$$

It has long been considered desirable to instead convert phosphate rock to a superphosphate wherein the phosphorus would be present as dicalcium phosphate, because of much better economy in use of sulphuric acid, the conversion of much less of the agriculturally valuable calcium oxide of phosphate rocks to relatively useless, and bulky and weighty gypsum diluting the superphosphate product, to obtain the advantages of a non-acid product, and to realize other benefits and advantages. The corresponding but hitherto unrealized explanatory equation showing conversion of phosphate rock by use of a less proportion of sulphuric acid to (theoretically) produce a superphosphate containing its phosphorus present as dicalcium phosphate and much less diluted with gypsum is written

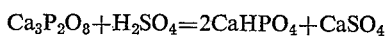

$$Ca_3P_2O_8 + H_2SO_4 = 2CaHPO_4 + CaSO_4$$

It has been found however, that in the conversion of phosphate rock, by use of sulphuric acid, to a superphosphate, if the used proportion of sulphuric acid is substantially reduced below the proportion commonly used in production of "normal," "regular" etc. superphosphate of the fertilizer trades, that the result is not the formation of an increased amount of dicalcium phosphate in the product, but that instead there is a reduced conversion of phosphate rock and a waste, in the product, of unconverted and relatively worthless phosphate rock.

Facts similar to the above exist in the conversion of phosphate rock to "triple" or "enriched" superphosphate, using phosphoric acid, or mixed phosphoric and sulphuric acid, instead of sulphuric acid. But the relative advantages of conversion of phosphate rock to a superphosphate essentially containing its phosphorus present in the form of dicalcium phosphate, with use of phosphoric acid as means of conversion of the phosphate rock, if realized, instead of as in the prior art, conversion to a superphosphate containing its phosphorus present in the form of monocalcium phosphate, are even greater than the above-mentioned advantages appearing in the use of sulphuric acid. The below equations are explanatory and indicate that (ideally or "theoretically") the proportional requirement of phosphoric acid, per unit weight of phosphate rock converted to a superphosphate of the prior art and containing its phosphorus essentially in the form of monocalcium phosphate, is four times the amount of phosphoric acid that would be required for conversion of the phosphate rock to a superphosphate containing its phosphorus essentially in the form of dicalcium phosphate.

In the conversion of phosphate rock to a superphosphate according to the prior art $$Ca_3P_2O_8 + 4H_3PO_4 = 3CaH_4P_2O_8$$

In the conversion of phosphate rock to a novel superphosphate according to the hereof $$Ca_3P_2O_8 + H_3PO_4 = 3CaHPO_4$$

In the next-below example, powdered phosphate rock is treated with and decomposed by treatment with solution of sulphuric acid and aluminum sulphate. Assuming that the chemical formula for the fluophosphate constituent of phosphate rock can be usefully taken as $Ca_9P_6O_{23}F_2$, the next-below equation, while not necessarily exact are believed to be useful in an explanatory way $$CaCO_3 + H_2SO_4 = CaSO_4 + H_2O + CO_2$$

$$2(Ca_9P_6O_{23}F_2) + Al_2(SO_4)_3 + 3H_2SO_4 \rightarrow 12CaHPO_4 + 2AlF_2OH + 6CaSO_4$$

(The compound $AlF_2OH$ has not been identified in the superphosphate product.)

In the next-below example the solution of sulphuric acid and aluminum sulphate is procured by dissolving bauxite in hot strong solution of sulphuric acid, converting part of the sulphuric acid to aluminum sulphate. The resulting mineral dregs need not be separated from the resulting solution prior to use in treating and converting the phosphate rock.

EXAMPLE 1

10.2 parts of bauxite containing 50% of acid-soluble $Al_2O_3$ is treated with hot solution of sulphuric acid used in the amount which contains 42 parts of actual $H_2SO_4$, converting the alumina of the bauxite into aluminum sulphate contained in the resulting solution of sulphuric acid and aluminum sulphate. To the resulting said solution there is added and stirred in 100 parts of phosphate rock of the analysis CaO 47.8%, $P_2O_5$ 32.8%, fluorine 3.9% and acid-insoluble 8.5%. The mixture is maintained at a temperature of about 90 degrees C. with adjustment in the amount of water in the mixture to maintain a thick slurry but not thick enough to break up into separate clods for 48 hours or such less time until examination of small test portions with a magnifying glass shows the original dark-colored grains have disappeared. The time required for digestion varies widely according to the fineness of grinding of the phosphate rock and is shortened if the rock is calcined before use. The product when carefully dried amounts to about 170 parts containing gypsum about 40% and dicalcium phosphate dihydrate about 45% with the balance dirt and aluminum-fluorine compound.

Compared to the large-scale conversion of phosphate rock by sulphuric acid alone, to the well-known "regular" or "normal" superphosphate of the fertilizer trades, the example shows a large saving in sulphuric acid and a much reduced conversion of the agriculturally-valuable calcium of the used phosphate rock to relatively useless calcium sulphate diluting the product.

EXAMPLE 2

In a further example, finely pulverized phosphate rock is chemically converted to crude neutral superphosphate containing its agriculturally useful phosphorus principally present in the form of dicalcium phosphate, $CaHPO_4$, by treatment with phosphoric acid instead of with use of sulphuric acid as in Example 1.

To provide an aluminum salt for the herein-described use in decomposition and conversion of phosphate rock, I have found that use of acid solution containing aluminum phosphate less convenient than the use of solution containing other aluminum salt and have found that use of solution of phosphoric acid containing acid aluminum phosphate to be less practical because of chemical instability. In the next following example, instead of making use of aluminum phosphate to provide aluminum as codecomposant of phosphate rock, aluminum salt is provided and used as aluminum sulphate. The aluminum sulphate may be provided and used in crude solution form as produced by treatment of bauxite with sulphuric acid, or as crude solution of aluminum sulphate and phosphoric acid producible by treatment of raw or calcined high-alumina natural phosphorite etc. with sulphuric acid.

In example 2, 100 parts of finely powdered phosphate rock of the above-stated analysis is mixed and treated with solution containing phosphoric acid in the amount of 23 parts of actual $H_3PO_4$ and containing aluminum sulphate in the amount which contains 2.8 parts of alumina. During the treatment and conversion of the mixture to superphosphate, the mixture is adjusted to contain the amount of water which maintains the mixture in the condition of a thick slurry but not thick enough to break up into separate clods by a used stirring device and is preferably maintained at a temperature of about 90 degrees C. for 72 hours or such less time until a sample of the mixture examined with a magnifying glass shows that the original dark-colored particles of the phosphate rock have disappeared and the mixture has developed a well-bleached appearance. During the treatment and conversion of the mixture to superphosphate a suitable device is used to prevent stratification of the mixture.

The use of phosphate rock which has been pulverized to a very fine degree, or which has been previously furnace-treated to destroy the refractory gluey constituent of the phosphate rock, results in more rapid conversion of the mixture to a wet superphosphate.

The product is then dried or allowed to dry in storage and amounts to 160–170 parts containing about 16% of gypsum, 70–75 parts of $CaHPO_4 \cdot 2H_2O$ and containing unchanged original non-phosphoric constituents of the used phosphate rock, and containing aluminum-fluorine compound.

In the treatment and conversion to superphosphate no fluoride vapors are present.

It is also an object to achieve the obtaining of a phosphate product from fluoriferous phosphate rock used in part and from aluminous phosphate mineral used in other part, each of said minerals being utilized as sources of phosphorus of the product, and to obtain reciprocally beneficial results from the use of each of the said mineral sources in utilization of the other.

In applications of the invention, usefully obtaining from both of said minerals as sources-in-part of the phosphorus constituent of a product, the below examples are illustrative.

In the practice of the invention as shown below by examples the used aluminous phosphate mineral is treated with solution of sulphuric acid for solubilization and extraction of its phosphorus constituent. There is used the proportional amount of sulphuric acid sufficient to result in extraction of a high proportion of the phosphorus of the mineral, preferably in the range of an extraction of 85% or more. Heretofore, in treatment of aluminous phosphate mineral with an acid solution used for dissolution and extraction of phosphorus, when a sufficient proportion of acid has been used to assure the extraction of a high proportion of the phosphorus of the mineral, a large amount of aluminum has also been dissolved, resulting in production of an extract solution also containing a large amount of aluminum salt, such as the sulphate, as a hitherto deleterious solution constituent of large disadvantage in the prior art of converting the extracted solution to a phosphate product.

But in this invention applied as below described, wherein the said mineral is treated with solution containing a sufficiency of acid to obtain a good extraction of phosphorus (such as 85% or more), but unavoidably as before dissolving and extracting a large amount of aluminum then present as an aluminum salt in the extract solution containing the phosphoric acid, there are now instead obtained novel benefits from the so-contained aluminum salt as appears in the following.

As an example of such benefit, in a direct but novel application of the invention shown below, so produced solution of substantial content both of phosphoric acid and aluminum salt is used in direct conversion of a mixture of phosphate rock and said solution to a superphosphate product containing the phosphorus derived from both phosphate rock and solution, principally present in the form of dicalcium phosphate dihydrate. In the below example, the said salt used is aluminum sulphate.

Preparatory to the operation of mixing and reacting phosphate rock with solution of phosphoric acid and aluminum sulphate so-obtained from said mineral, having the chemical analysis of the to-be-used phosphate rock and of the said solution, the used proportion of rock and solution is selected so that in the mixture of rock and solution, the weight proportion of fluorine (element) to alumina ($Al_2O_3$) is in the ratio of about 0.67 so that in the mixture to be made and used $$\frac{\text{Amount of fluorine}}{\text{Amount of } Al_2O_3} = 0.67$$

Use of a mixing proportion substantially higher than corresponds to the number 0.67 generally leads to a poorer technical result and use of a mixing proportion corresponding to the number 1 appears to be useless. Use of a mixing ratio corresponding to a number less than about 0.67, while practical and successful, tends to be more expensive and wasteful and to result in a superphosphate product of lower grade. The mixing proportion used may advantageously be adjusted in accordance with actual tests made with the particular materials used.

A so-proportioned mixture of powdered phosphate rock and so-obtained solution of phosphoric acid and aluminum sulphate is held and digested in any practicable way, preferably with use of means to prevent settling and stratification of the mixture, and holding the mixture heated to hasten the conversion of the constituents to a slurry or paste of the superphosphate. The primary product is a slurry or paste of solid calcium sulphate, hydrated dicalcium phosphate, sandy and earthy non-phosphorus substances of the used minerals, and a compound of aluminum and fluorine. A product of dry or dehydrated superphosphate may then be derived in any practicable way, such as drying the paste or or filtering the solids from the water or weak solution. Also, the slurry or paste may be first mixed and compounded with other fertilizer substances and the resulting mixture applied as fertilizer or dried to a solid product.

In an example, the atomic ratio of calcium to phosphorus in the mixture of phosphate rock and solution of phosphoric acid and aluminum sulphate is close to the atomic ratio Ca:P. Consequently, in the digestion referred to, the final decomposition of the phosphate rock is only slowly completed. In such an instance, to obtain a more rapid and complete conversion of the phosphate rock, it may be of advantage to add to the mixture of rock and solution, a small proportion of phosphoric acid from another source. In instances where the calcium to phosphorus proportion in the mixture of phosphate rock and solution of phosphoric acid and aluminum sulphate is greater than 40 parts of calcium per 13 parts of phosphorus, by weight, an appropriate addition of phosphoric acid (or sulphuric acid) to the mixture is beneficial in accomplishing the substantially complete decomposition of the phosphate rock used.

EXAMPLE 3

The to-be-used solution of phosphoric acid and aluminum sulphate obtained by treating and decomposing aluminous phosphate mineral with sulphuric acid, whether or not separated from undissolved solids of the treated said mineral, contains $P_2O_5$ 14.5%, $Al_2O_3$ 4.8% and fluorine 0.8%. The to-be-used powdered phosphate rock contains CaO 48.6%, $P_2O_5$ 30.4% and fluorine 3.2%. Computation shows that to obtain a mixture of the phosphate rock and of the said solution that for each 100 parts of the solution taken, 76 parts of the phosphate rock are required to obtain a mixture corresponding to the number 0.66.

Further computation shows that the proportional amount of $P_2O_5$ in the mixture of 76 parts of the phosphate rock and 100 parts of said solution taken is insufficient to convert all the calcium of the mixture to calcium phosphate. Accordingly the amount of phosphoric acid which contains 4 parts of $P_2O_5$ taken from another source is added to the mixture. The mixture is maintained and reacted as above described until the mixture is converted to a bleached paste consisting of a suspension of solid gypsum, solid dicalcium phosphate dihydrate, unconverted mineral particles from the minerals used and aluminum-fluorine compound. The whole is then dried to a mass of solids in the amount of about 135 parts containing about 30% $P_2O_5$ of which more than 90% is soluble in citric or tartaric acid solution.

Certain aluminous phosphate minerals when treated with sulphuric acid solution to extract phosphoric acid and unavoidably also dissolving a large proportion of alumina, yield an unfilterable mass. In the below example no filtration is required to utilize the mineral in production of a superphosphate product.

In the below example the product of treatment of aluminous phosphate mineral with solution of sulphuric acid is not filtered. Instead powdered phosphate rock is added to the fluid product resulting from the treatment of the mineral with sulphuric acid, and the whole digested for the necessary time for substantial completion of the resulting chemical reactions and conversion of the constituents of the mixture to a superphosphate consisting of solid particles of calcium sulphate, artificial calcium phosphate, unchanged mineral particles of the used phosphate rock and aluminum-fluorine compound etc. dispersed in water or weak solution. The converted paste is then dried or otherwise unwatered producing a dried superphosphate, or the paste having a high content of colloidal matter, made use of to yield mixed fertilizer of a superior condition of granulation.

EXAMPLE 4

There is taken and used aluminum phosphate mineral-containing by analysis 15.5% of $P_2O_5$ of which 14.6% is acid-soluble, 13% of $Al_2O_3$ of which 6.5% is acid-soluble, and 1% fluorine, in the amount of 100 parts. The to-be-used phosphate rock contains by analysis 48% of CaO, 30.5% of $P_2O_5$ and 3.1% of fluorine. Computation shows, to obtain a mixture of the phosphate rock and the fluid mass produced by treatment of the aluminous phosphate mineral with solution of sulphuric acid, to contain fluorine and acid-dissolved alumina in proportion corresponding to the number 0.68, that with the use of 100 parts of the said mineral, 119 parts of the phosphate rock are usable. Accordingly, there is added to the fluid product obtained from treatment of 100 parts of the mineral with solution of sulphuric acid, 119 parts of the pulverized phosphate rock.

Further computation shows that the amount of $P_2O_5$ in the mixture of said rock and said fluid is scarcely sufficient to convert all the calcium present to dicalcium phosphate. Accordingly, there is added to the mixture phosphoric acid from another source in the amount containing 6 parts of $P_2O_5$. The whole is then digested converting the mixture into a paste of crude superphosphate whereof the phosphorus is mostly present in the form of dicalcium phosphate. When dried the superphosphate product amounts to about 260 parts containing about 23% of $P_2O_5$ soluble in 2% solution of citric acid.

In application of the invention as shown in the above examples when addition of an acid is made to the mixture of phosphate rock and solution of aluminum sulphate and phosphoric acid, sulphuric acid may be used instead of phosphoric acid but with less advantage.

In application such as shown in the preceding examples, mixing and reacting together solution of aluminum sulphate and phosphoric acid obtained by the treatment of aluminous phosphate mineral with solution of sulphuric acid and powdered phosphate rock, the mixture then converted to a superphosphate product, the used solution contains a considerable proportion of aluminum sulphate whereof the sulphate constituent reacts with calcium oxide of the used phosphate rock, resulting in a superphosphate product containing a substantial proportion of relatively useless calcium sulphate.

As a further improvement, to produce a substantially gypsum-free novel superphosphate, the solution of aluminum sulphate and phosphoric acid so obtained from aluminous phosphate mineral, before being mixed with powdered phosphate rock and used to produce a superphosphate product, is desulphated by treatment with a portion of powdered phosphate rock converting the $SO_4$ constituent of the solution to solid calcium sulphate which is removed by filtration and the separated solution is then used in a like treatment according to the preceding examples.

EXAMPLE 5

100 parts of aluminous phosphate mineral, preferably calcined before use and of analysis CaO 12%, $Al_2O_3$ soluble in dilute sulphuric acid 6%, $P_2O_5$ soluble in the acid treatment 14%, and fluorine 0.7% is treated with and decomposed by 22% sulphuric acid in the amount which contains 47.1 parts of $H_2SO_4$. The produced solution contains $Al_2O_3$ 6 parts, $P_2O_5$ 14 parts, $SO_4$ 26.1 parts and fluorine 0.7 parts.

The phosphate rock to be used contains CaO 49%, $P_2O_5$ 33% and fluorine 3.5% Calculation shows that the proportional amount of the phosphate rock containing sufficient calcium to convert the $SO_4$ of the said solution is about 30.2 parts.

Accordingly, there is added to the solution obtained by treatment of the aluminum phosphate mineral with solution of sulphuric acid 30.2 parts of the phosphate rock and the mixture is held and maintained as a reacting suspension until the decomposition of the phosphate rock is substantially completed.

The resulting solution is separated from the solid matters and contains an estimated 23.9 parts of $P_2O_5$ and 6 parts $Al_2O_3$ and the fluorine of both of the used mineral sources.

Computation shows, to prepare a mixture of the latter said solution and phosphate rock of the above analysis, the mixture to contain calcium and phosphorus in the same proportion as contained in dicalcium phosphate, that 83 parts of the phosphate rock are required. Accordingly 83 parts of said powdered phosphate rock is mixed with the latter said solution and the whole maintained as a wet suspension until the conversion and chemical reactions are substantially completed. The product is dewatered to a dried superphosphate in the amount of about 155 parts containing approximately 32% $P_2O_5$ soluble in 2% solution of citric acid.

In some regions where very great quantities of phosphate rock are produced, the loss in discarded aluminous phosphate mineral substances is proportionally large, and disposal of such waste, if in the form of thin slimes to be piled in ponds behind dams, is a serious nuisance.

According to the invention such waste can be made valuable by first treating and chemically decomposing such waste mineral substance with sulphuric acid thereby dissolving most of its phosphorus but necessarily also dissolving a large proportion of the alumina then present mainly as aluminum sulphate in a resulting solution of aluminum sulphate, phosphoric acid and a smaller proportion of aluminum-fluorine compound.

In the treatment of the aluminous mineral with sulphuric acid there may be applied to the mineral a proportion of sulphuric acid substantially in excess of the proportion necessary to dissolve the phosphorus of the mineral since in the following process step according to the invention an additional amount of sulphuric acid may be required but can be instead introduced earlier.

Having so obtained solution of aluminum sulphate, phosphoric acid, etc., by treatment of aluminous phosphate mineral with sulphuric acid, whether or not the resulting solution is separated from the associated resulting calcium sulphate and from the solids of the used mineral, the solution is then used in the chemical treatment of phosphate rock in the presence of sufficient acid to decompose substantially all of the calcium phosphate of the used phosphate rock.

The proportion of treated phosphate rock and therewith mixed solution of aluminum sulphate, phosphoric acid, etc., according to the foregoing, is so chosen that for each part of fluorine introduced in the used phosphate rock and in the used solution, there is preferably provided and present in the mixture of rock and solution the amount of aluminum salt which preferably contains from about 1.3 to about 1.8 parts of $Al_2O_3$ (alumina), in dissolved form. There is also provided in the said mixture of rock and solution the amount of sulphuric acid, or of nitric acid, or of both each in part, sufficient to decompose the calcium phosphate of the used phosphate rock and to convert the phosphorus of the rock to a dissolved acidic compound of phosphorus, preferably phosphoric acid.

The produced solution containing as its prinicipally valuable ingredients phosphoric acid and aluminum-fluorine compound is separated from solid calcium phosphate and other solid matters, as an intermediate or final product. Preferably aluminum and fluorine are precipitated from the separated solution by precipitation as a solid fluoaluminate recovered as a product from recovered solution of phosphoric acid as a product.

It is an equivalent, but less preferred, to use the same amounts of aluminous phosphate mineral, phosphate rock and sulphuric acid together in a single batch and a single operation, to produce solution of phosphoric acid and aluminum and fluorine compound.

The foregoing-described utilization of both aluminous phosphate mineral and phosphate rock as doubled sources of phosphorus is not limited to the sole use of sulphuric acid. Instead of sole use of sulphuric acid, nitric acid may be used in part in substitution for sulphuric acid, by those skilled in the art, to produce instead of solution of phosphoric acid, solution of calcium nitrate and phosphoric acid.

In the above-described decomposition of phosphate rock with so-obtained solution of aluminum sulphate and phosphoric acid the proportion of $Al_2O_3$ to fluorine is not limited to the proportion of either 1:1.3 or 1:1.8. The decomposition of the rock without formation of either hydrofluoric or fluosilicic acid succeeds if the proportion of $Al_2O_3$ to fluorine in the mixture of rock and solution considerably exceeds the proportion of 1.8 parts of $Al_2O_3$ for each part of fluorine.

In the practice of the invention utilizing sulphurous acid.—It has been proposed to treat and decompose phosphate rock with sulphurous acid, and thereby to convert phosphate rock to chemical products of phosphorus. The proposals have not been commercially applied with success. The resistance of fluoriferous phosphate rock to chemical attack by sulphurous acid is well known. I have found that such resistance may be decreased by the presence of an aluminum salt in the so-used sulphurous acid. In such use there may be used, for example, aluminum sulphate, aluminum sulphite or persulphite, or an aluminate of a common base which decomposes in an acid solution applied in treatment of phosphate rock.

Phosphate rock prior to treatment with sulphurous acid should be ground as finely as commercially practicable and preferably should be calcined to destroy its refractory carbonaceous constituent.

The powdered phosphate rock is suitably used in a suspension or slurry and brought into contact with a stream of $SO_2$-containing gas, using any well-known equipment in any known practicable manner. The used liquid medium of suspension may be water, solution of an aluminum salt, or a suspension in water or solution of a powdered reactable aluminous substance, such as crude solid sodium aluminate produced by furnacing together sodium carbonate and a suitable aluminous substance such as bauxite, high-alumina clay, aluminous phosphate mineral, etc.

The used aluminum compound may be selected from, but without limitation thereto, aluminum sulphate, sulphite or persulphite, hydroxide, phosphate, etc., or an aluminate of a common alkaline base, for example sodium aluminate, $NaAlO_2$. It is optional to use a medium of absorption of $SO_2$ already containing suspended powdered phosphate rock or to first convert an aluminate to a solution of persulphites and then introduce the powdered phosphate rock.

EXAMPLE 6

100 parts of calcined phosphate rock of analysis CaO 48.7%, $P_2O_5$ 32.9% and fluorine 3.8% is finely pulverized and used as a suspension in 150 parts of solution of aluminum sulphate containing 18% of $Al_2(SO_4)_3$. 18 or more parts of $SO_2$ are absorbed. The suspension is placed in a pressure-resisting container and cooked under pressure, completing the conversion of the suspension to a suspension of a superphosphate composed principally of dicalcium phosphate, calcium sulphate and calcium sulphite. The suspension is then dewatered recovering a mass of superphosphate in the amount of 124 parts, and containing 25% of $P_2O_5$ soluble in 2% solution of citric acid.

EXAMPLE 7

Concentrated solution of sodium aluminate (produced from bauxite and sodium hydroxide) of the characteristics of sodium aluminate solution made from bauxite in the "Bayer" process of producing alumina, nominally of the composition according to $NaAlO_2$, is taken in the amount which contains 3 parts of aluminum (element) and diluted to 125 parts of solution. There is added to and incorporated into a suspension 100 parts of the same powdered phosphate rock as used in Example 6. The suspension is used to absorb $SO_2$ from a gas stream containing the same until the suspension is saturated with $SO_2$. 34 parts of $SO_2$ are absorbed.

The resulting suspension may be cooked in a pressure-resisting container under pressure to hasten the conversion of the constituents of the mixture to a suspension of calcium sulphite, dicalcium phosphate dihydrate, aluminum-flourine compound and unchanged mineral particles of the used phosphate rock.

The mixed solids are then recovered as wet filter cake by filtration from weak solution containing sodium sulphite etc. The cake when dried amounts to 145 parts of a novel superphosphate mainly composed of calcium sulphite and dicalcium phosphate dihydrate and containing 21% of $P_2O_5$ soluble in 2% solution of citric acid.

In this example it is sometimes more convenient to introduce $SO_2$ into solution of sodium aluminate in a first step followed by addition of the powdered phosphate rock.

The superphosphate products obtained according to all of the above descriptions contain solid aluminum-fluorine compound as an impurity and with loss and waste of the fluorine.

According to an improvement herein disclosed, concentrated sulphur dioxide is applied to a suspension of any of the superphosphates herein disclosed under conditions of pressure and $SO_2$ concentration sufficient to dissolve the phosphorus of any of the said superphosphates then present in solution mostly as monocalcium phosphate and phosphoric acid. The so-produced solution is separated from solid matters and then treated by boiling or evacuation of $SO_2$ under partial vacuum to remove sulphur dioxide, after treatment of the phosphorus-containing solution to precipitate the fluorine constituent. By dissolution in sulphurous acid, the superphosphates may be purified and refined and recovered with less calcium sulphate, sulphite, dirt and fluorine.

Alternatively to such use of sulphurous under pressure any of the superphosphates herein disclosed may be treated with a larger volume of cold strong sulphurous acid, dissolving the phosphorus, separating the solution from solids and fluorine and then either boiling out the $SO_2$ or removing the same under evacuation, reprecipitating a refined and purified superphosphate mainly of dicalcium phosphate.

I claim:

1. The process of making a solid-particled composition of calcium salt of acid of the group consisting of sulphuric, sulphurous, phosphoric and mixed sulphuric and phosphoric acids, of which composition dicalcium phosphate dihydrate constitutes not less than a third of its solids, which process comprises treating fluorine-containing phosphate rock with solution of acid selected from said group of acids applied to said phosphate rock in a proportion sufficient to substantially convert the phosphorus in said used phosphate rock to dicalcium phosphate, said reacting being carried out in the presence of fluorine acceptive aluminum salt other than contained in said phosphate rock present in the mixture in an amount sufficient to provide between ½ and 1½ weight units of aluminum for each weight unit of fluorine in said treated phosphate rock and recovering a product whereof the solids principally consist of calcium salt of acid of said group and of which salt dicalcium phosphate dihydrate is not less than one-third by weight.

2. The process according to claim 1 wherein the selected acid is sulphuric acid and the solids of the product principally consist of calcium sulphate and dicalcium phosphate dihydrate.

3. The process according to claim 1 wherein the selected acid is sulphurous acid and the solids of the product consist principally of calcium sulphite and dicalcium phosphate dihydrate.

4. The process according to claim 1 wherein the selected acid used is phosphoric acid and the aluminum salt used is aluminum sulphate and the solids of the product principally consist of calcium sulphate and dicalcium phosphate dihydrate the latter present in the product in a greater proportion than the proportion of calcium sulphate therein.

5. The process according to claim 1 wherein the phosphorous of the product of dicalcium phosphate is dissolved in solution of sulphurous, the resulting solution is separated from solid particles, sulphur dioxide in gaseous form is removed from the solution causing deposition of a solid artificial calcium phosphate which is separated from the solution and recovered in the solid product.

6. As a new product of manufacture the product of the process of claim 2.

7. The process of claim 1 further characterized by immersion of the product recovered whereof the solids principally consist of calcium salt of acid of said group and and of which salt dicalcium phosphate dihydrate is not less than one-third by weight in a solution of sulphurous acid wherein the dicalcium phosphate is dissolved and recovered as a substantially solid-free solution, and gaseous sulphur dioxide is removed from the latter said solution resulting in the precipitation of solid dicalcium phosphate dihydrate which is separated from the associated solution and is recovered in a solid product principally consisting of dicalcium phosphate dihydrate.

References Cited

UNITED STATES PATENTS

| | | | |
|---|---|---|---|
| 2,769,703 | 11/1956 | Andres et al. | 71—39 |
| 2,968,543 | 1/1961 | Nees et al. | 71—37 |
| 2,104,295 | 1/1938 | DeVarda | 23—109 |
| 2,812,239 | 11/1957 | Porter | 23—143 |
| 2,903,338 | 9/1959 | Porter | 23—52 |
| 2,176,464 | 10/1939 | Merchant | 23—109 |

FOREIGN PATENTS 563,515  9/1958  Canada.

OSCAR R. VERTIZ, Primary Examiner
HOKE S. MILLER, Assistant Examiner

U.S. Cl. X.R.

71—33

UNITED STATES PATENT OFFICE
CERTIFICATE OF CORRECTION

Patent No. 3,489,510                                  January 13, 1970

Anson G. Betts

It is certified that error appears in the above identified patent and that said Letters Patent are hereby corrected as shown below:

Column 12, line 75, after "sulphurous" insert -- acid --.

Signed and sealed this 10th day of November 1970.

(SEAL)
Attest:

Edward M. Fletcher, Jr.                         WILLIAM E. SCHUYLER, JR.
Attesting Officer                                 Commissioner of Patents